United States Patent [19]

Gneiding

[11] 4,323,086

[45] Apr. 6, 1982

[54] PRESSURE RESPONSIVE FLOW CONTROL APPARATUS FOR BREATHING SYSTEM

[75] Inventor: Donald R. Gneiding, Fullerton, Calif.

[73] Assignee: Robertshaw Controls Company, Richmond, Va.

[21] Appl. No.: 129,369

[22] Filed: Mar. 11, 1980

[51] Int. Cl.³ .............................................. F16K 31/14
[52] U.S. Cl. ............................. 137/495; 137/505.15; 137/505.25
[58] Field of Search ................... 137/505.15, DIG. 9, 137/505.25, 495

[56] References Cited

U.S. PATENT DOCUMENTS

| 1,408,923 | 3/1922 | Bastian | 137/505.15 |
| 3,425,442 | 2/1969 | Johnson | 137/505.15 |
| 3,995,656 | 12/1976 | Mills | 137/505.25 X |

FOREIGN PATENT DOCUMENTS 526386  9/1940  United Kingdom ......... 137/DIG. 9

Primary Examiner—Harold W. Weakley
Attorney, Agent, or Firm—Fulwider, Patton, Rieber, Lee & Utecht

[57] ABSTRACT

Pressure responsive flow control apparatus for connection between a source of emergency breathing gas and a hood adapted to fit about a wearer's head for receiving the breathing gas at a controlled flow for inhalation and for receiving the exhalations of the wearer. The flow control apparatus includes a pressure regulating valve operative to maintain a substantially constant discharge pressure to the hood despite progressively decreasing source pressure. Further included is a flow control valve operative against a bias force, and responsive to source pressure, to control gas flow to the hood, the bias force being effective to move the flow control valve such that the rate of gas flow increases with diminishing source pressure thereby to compensate for increased concentration of carbon dioxide in the hood resulting from cumulative exhalations of the wearer.

6 Claims, 3 Drawing Figures

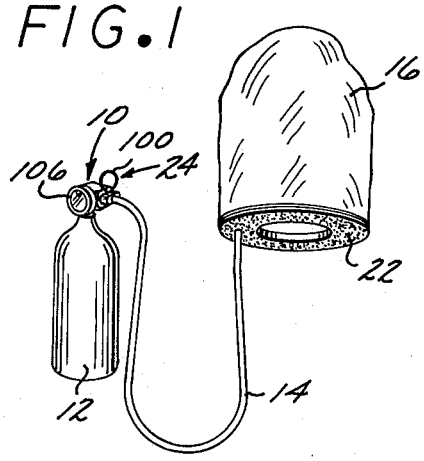
FIG. 1  FIG. 2
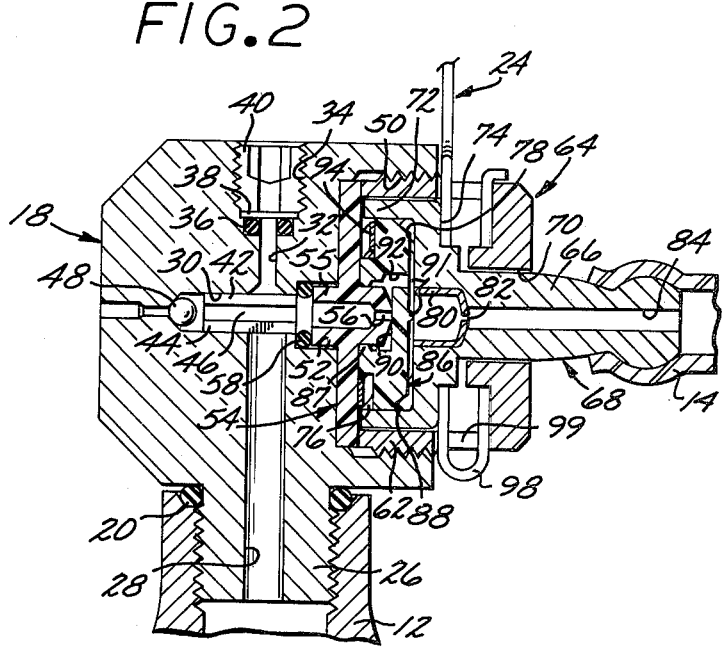
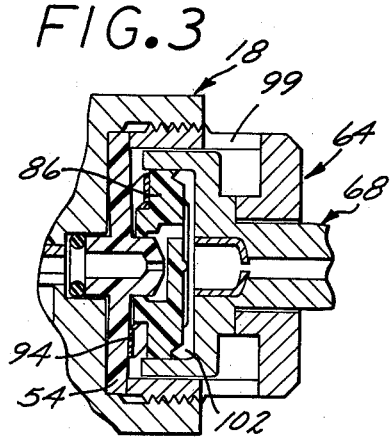
FIG. 3
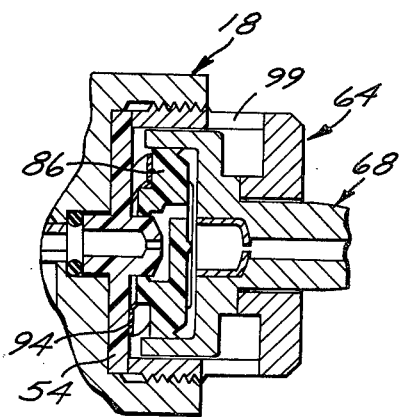
FIG. 4
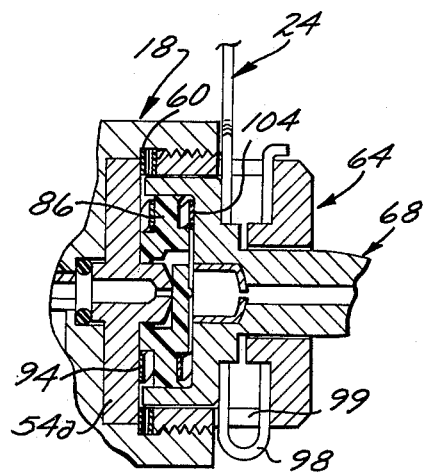
FIG. 5
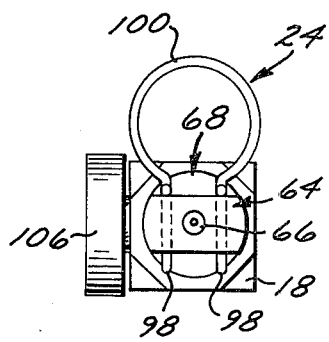
FIG. 6

PRESSURE RESPONSIVE FLOW CONTROL APPARATUS FOR BREATHING SYSTEM

BACKGROUND OF THE INVENTION

1. Field of the Invention

The present invention relates to pressure responsive flow control apparatus particularly adapted for use in combination with emergency breathing apparatus which includes a hood adapted to fit about a wearer's head for receiving the breathing gas.

2. DESCRIPTION OF THE PRIOR ART

Emergency breathing systems employing a hood to fit about a wearer's head are already available. One such system utilizes a hood made of transparent plastic material that fits snugly about the wearer's neck such that it also serves as an exhalation valve, venting the hood to maintain a suitable controlled pressure. Characteristically, such a breathing system includes regulating means to maintain hood pressure and also the rate of breathing gas flow substantially constant despite diminishing source pressure.

The source of pressure in such a system is usually a compressed air bottle adapted to provide air for a relatively short period of time, long enough for example to enable the wearer to escape from a smoke-filled building. However, the cumulative effect of the carbon dioxide in the exhalation collecting in the hood has an adverse effect on the wearer and a need exists for flushing out or otherwise ridding the hood of undesirably high concentrations of such carbon dioxide.

SUMMARY OF THE INVENTION

The present invention comprises pressure responsive flow control apparatus adapted to be connected between a source of emergency breathing gas and a hood adapted to be fitted to the wearer. The apparatus comprises a valve body for receiving the breathing gas to develop a source pressure, and a flow control means having a primary flow passage to accept gas at the source pressure.

Prior to use of the apparatus, a pressure regulating valve located adjacent the flow control valve means is normally seated to close off the primary flow passage, and is held in this position by a release element. The release element is quickly releasable to allow the pressure regulating valve to move away from the primary flow passage under the influence of source pressure. This is followed by a pressure increase in a chamber on the opposite side of the pressure regulating valve, moving it back against the bias of a set point or reference bias means and into proximity with the primary flow passage. The degree of such proximity throttles the flow of gas through the primary flow passage according to the spring constant of the reference bias means and the level of source pressure, thus tending to establish a relatively constant level of gas pressure and flow to the hood as the source pressure diminishes with use.

The adjacent flow control valve means also tends to move into close proximity with the pressure regulating valve on initial establishment of source pressure, thereby also reducing the rate of flow of gas through the primary flow passage at higher source pressures. However, the flow control means includes a second bias means which opposes the forces developed by source pressure. This bias means thus tends to oppositely move the flow control valve. Accordingly, at lower source pressures the flow control valve moves to increase the rate of flow of gas through the primary flow passage. The increased rate of flow is preferably in substantially inverse proportion to the decrease in the source pressure whereby increased concentrations of carbon dioxide in the breathing hood are more completely flushed away, as compared with the concentrations which would exist if the rate of gas flow were constant or diminished.

Various modifications and changes may be made with regard to the foregoing detailed description without departing from the spirit of the invention.

BRIEF DESCRIPTION OF THE DRAWINGS

FIG. 1 is a perspective view of the present pressure responsive flow control apparatus mounted to a compressed air tank and connected by flexible tubing to a hood adapted to fit about a wearer's head for receiving compressed air at a controlled flow;

FIG. 2 is a vertical cross-sectional view of the flow control apparatus of FIG. 1, and illustrating the components in their closed or air blocking positions;

FIG. 3 is a partial, vertical cross-sectional view of the components of FIG. 2 in their positions responsive to a relatively high source pressure;

FIG. 4 is a view similar to FIG. 3, but illustrating the components in their positions responsive to a relatively low source pressure;

FIG. 5 is a view similar to FIG. 2, but illustrating a second embodiment of the flow control apparatus; and FIG. 6 is an end elevational view of the release element in its seated position, as the same would appear for either the embodiment of FIG. 2 or that of FIG. 5.

DESCRIPTION OF THE PREFERRED EMBODIMENTS

Referring now to the drawings, and particularly to FIGS. 1 through 4 and 6, there is illustrated a pressure responsive flow control apparatus 10 connected to a compressed air cylinder 12 which constitutes a source of emergency breathing gas. The apparatus 10 is connected by a flexible conduit or tube 14 to a hood 16 adapted to fit about a wearer's head for receiving the breathing gas or air at a controlled flow.

Although the present apparatus 10 is adapted for use in combination with various sources of breathing gas and breathing gas dispensers, it is especially intended for use with an air cylinder 12 containing a supply of compressed air or oxygen enriched air adapted to last for a relatively short period of time, such as approximately 3 to 5 minutes.

Various gas mixtures can be used, but typically the wearer's exhalations into the hood 16 result in a progressive increased concentration of carbon dioxide. It is a purpose of the present invention to increase the rate of flow of the breathing gas to the hood 16 over the relatively short period of time it takes to discharge the air supply from the cylinder 12. As previously indicated, this increased flow provides better scavenging or flushing of the carbon dioxide concentrations which would otherwise accumulate in the hood 16. As will be seen, the apparatus 10 is operative to increase the rate of gas flow to the hood 16 in inverse proportion to the source pressure so that as the source pressure decreases due to usage, the gas flow to the hood increases proportionally.

The air cylinder 12 includes a threaded neck to threadably receive a valve body 18 of the apparatus 10, a usual O-ring 20 being employed to ensure a sealing relationship.

The hood 16 is preferably made of a flexible, transparent, plastic material well known in the art for its tear resistance and resistance to high temperatures. The base 22 of the hood is made of a thin elastomeric sheet material such as rubber dimensioned to snugly fit about the wearer's neck, and thereby yieldable to pressure buildup in the hood 16 to vent the hood in the manner of an exhalation valve.

It should be understood that the type of breathing system with which the present apparatus is concerned is an emergency system, capable of easy storage, readily accessible, and simple to operate. It is designed to provide sufficient breathing air for escape from an area in which breathing of environmental air is dangerous, as in a burning building or vehicle. Typically, as with a fire extinguisher or the like, it would be conveniently stored in the area of need so that a user only has to strap the cylinder 12 over his shoulder or neck, operate a release element 24 to initiate the flow of breathing gas to the hood 16, as will be seen, and place the hood 16 over his head.

With particular reference to the valve body 18, it is preferably made of plastic and is attached to the cylinder 12 by means of an externally threaded boss 26 which is received within the internally threaded upper end of the air cylinder 12, as previously indicated. An inlet passage 28 extends through the boss 26 and intersects a right angularly disposed bore 30 extending through the valve body 18. A relief passage 32 constitutes a continuation of the inlet passage 28, extending through the body 18 and terminating in an enlarged internally threaded recess 34.

An O-ring 36 is located in the base of the recess 34 and underlies a rupturable membrane disc 38 which is forcibly depressed to seal off the relief passage 32 by a centrally bored, externally threaded plug 40. The arrangement just described constitutes an over-pressure safety or relief valve adapted to vent pressures exceeding a predetermined value through rupture of the disc 38.

The bore 30 closely receives an elongated, centrally bored sleeve 42 which includes an elongated slot 44 to facilitate the passage of gas from the inlet passage 28 to the internal bore of the sleeve 42, which constitutes a first chamber 46 adapted to receive the breathing gas for development of a source pressure within the valve body.

The outer end of the bore 30 is of diminished cross-section to define a valve seat for receiving a spherical fill check valve 48, which is normally seated to block the passage of gas from the first chamber 46 to the exterior of the valve body 18.

The opposite extremity of the bore 30 opens into a relatively large diameter, internally threaded recess 50 opening to the exterior of the valve body 18. An interior, intermediate diameter counterbore 52 is located between the bore 30 and recess 50.

A flow control means is located within the recess 50 and counterbore 52, comprising a disc shaped flow control valve 54 having a transversely disposed, cylindrical central portion 55 open at one end and having a primary orifice or flow passage 56 through its opposite end. The passage 56 is in communication with the source pressure chamber 46.

The inner extremity of the central portion 55 abuts against an O-ring 58 to provide a sealing relationship between the portion 55 and the counterbore 52. The O-ring 58 provides such sealing in response to source pressure. As will be seen, the source pressure initially is great enough to distend or deform the resilient valve 54, as seen in FIG. 3, and the inherent spring rate or bias of the material of the valve 54 tends to return the valve 54 to the position illustrated in FIG. 2. This bias force is an element of the flow control means. As will be disclosed in greater detail later, the embodiment of FIG. 5 is essentially similar to the embodiment of FIGS. 1-4 except for utilization of a rigid flow control valve 54a which is biased toward the source pressure chamber 46 by an annular corrugated spring element 60.

With respect to the embodiment of FIGS. 1-4, the peripheral margin of the flow control valve 54 is maintained in seated relation against the base of the recess 50 by the circumferential inner edge of a cylindrical skirt 62 forming a part of a cup-shape retainer 64 threadably mounted within the recess 50.

An elongated hose attachment portion 66 of a control housing 68 protrudes out of a central opening 70 provided in the retainer 64 and includes a bulbous outer extremity adapted to closely receive one end of the tube 14 which extends to the hood 16.

The inner, larger diameter portion of the housing 68 includes a cylindrical portion 72 having an outer face 74, and further includes a cylindrical recess 76 having a base or inner face 78. A cup 80 is seated within a bore provided through the inner face 78 and defines a secondary orifice or secondary flow discharge 82 in communication with a longitudinal passage 84 extending through the hose attachment portion 66.

A generally circular valve disc or pressure regulating valve 86 is located between the flow control valve 54 and the inner face 78 of the control housing 68. It is preferably sufficiently resilient, being made of nylon or the like, so that its outer margin or lip is deformable for sealing purposes, as will be seen. The valve 86 is axially or longitudinally movable between the flow control valve 54 and the face 78, and it includes an annular lip to provide a sealing relation between the valve 86 and the inner surface of the cylindrical portion 72 over which it slides.

The valve 86 includes a central bore with an annular lip 87 which receives and seals the outer extremity of the control portion 55 of the flow control valve 54, the bore terminating in a face 90 which is engageable with the central portion 55 to block the flow of air through the passage 56. In this regard, the outer face of the valve 86 is characterized by radially oriented ridges 91 which are engageable with the inner face 78 of the control housing 68, as seen in FIG. 2, to provide air passages in this position from the primary flow passage 56, through a passage 92 in the valve 86, to the interior of the cup 80.

An annular corrugated spring 94 biases the valve 86 away from the valve 54 so that air can pass through the flow passage 56 and past the adjacent face of the valve 86.

Location of the release element 24 in the position illustrated in FIG. 2 is effective to overcome the bias of the spring 94 and maintain the valve 86 in tightly seated relation against the control portion 55 to close off the passage 56 and block air flow therethrough. The release element 24 includes a pair of loops or reversely formed portions 98 constituting the extremities of a ring 100, as seen in FIG. 6, and these loops are received, respectively, in diametrically opposed openings 99 provided in the retainer 64. The opposite sections of each such loop 98 presses against the relatively stationary retainer 64 and the confronting outer face 74 of the movable control housing 68, thereby urging the inner face 78 against the pressure regulating valve 86 which, in turn, presses against the central portion 55 to block the primary flow passage 56. This is the state in which the apparatus 10 is stored preparatory to use.

In operation, a user fits the air cylinder 12 to his body by means of a carrying strap or the like (not shown), pulls the release element 24 and thereafter places the hood 16 over his head.

Source pressure immediately is established within the first or source pressure chamber 46, and this has the effect of outwardly distending or deforming the flow control valve 54 to the position illustrated in FIG. 3. At this time, the absence of the release element 24 allows the bias of the spring 94 to urge the pressure regulating valve 86 away from the primary flow passage 56 and air passes through the passage 92 and develops an elevated pressure in a second chamber 102 now defined by the spaced-apart adjacent faces of the regulating valve 86 and the control housing 68.

As will be apparent, relatively high pressures in the chamber 102 move the valve 86 toward the control valve 54 to restrict air flow out of the passage 56. This movement is resisted by the bias of the spring 94. Thus, appropriate selection of the spring rate of the spring 94 establishes a desired substantially constant pressure and flow rate to the hood 16.

As source pressure steadily declines, the flow control means effects an increasingly higher rate of air flow, thereby reducing carbon dioxide concentrations in the hood 16. This is accomplished through utilization of the inherent spring rate or bias of the material of which the valve 54 is made. This bias tends to move the valve 54 to the position illustrated in FIG. 4 at lower source pressures, independently of the throttling action provided by the regulating valve 86, and thereby increases air flow to the hood 16.

On this regard, it is noted that the valve portion 55 and spring 94 are radially spaced-apart sufficiently that, upon initial operation of the apparatus 10, portion 55 resiliently distends in response to source pressure approximately twice the distance that the spring 94 and valve 86 move together in response to such pressure. Conversely, such spacing also enables portion 55, upon substantial reduction in source pressure, to return, responsive to its own resilience, approximately twice the distance that the spring 94 and valve 86 return. The result is that the flow passage 56 is opened at a greater rate to increase the flow with diminishing source pressure.

The amount of air flow can be programmed to change as the inverse function of supply or source pressure so that as the source pressure decreases due to usage, the air flow to the hood 16 proportionately increases. This is accomplished by appropriate selection of the spring rates for the material of the valve 54 and the spring 94, and selection of appropriate dimensions of the various passages and orifices, as will be apparent to those skilled in the art. Such an increase in air flow greatly improves the comfort of the user. In contrast, if the flow rate of incoming air were constant or decreasing, as would normally be the case with regulators of the prior art, breathing would only be comfortable initially. As carbon dioxide accumulates in the hood, and is rebreathed by the user, he would begin to breath with difficulty.

As previously indicated, the embodiment of FIG. 5 is substantially identical to the embodiment already described except that a rigid control valve 54a is utilized. A spring 60 is interposed between the valve 54a and the inner extremity of the retainer 64 to urge the valve control portion 55 away from the valve 86 with diminishing source pressure. Another spring 104 is disposed within an annular recess in the valve 86 and acts against the adjacent inner face of the control housing 68 to bias the valve 86 away from the housing 68. The combined action of the springs 60 and 104 produces a flow rate generally equivalent to that produced by reason of the resilience of the valve 54 of the first embodiment.

As seen in FIGS. 1 and 6, a pressure indicator 106 of any suitable design can be threaded into an opening in communication with the source pressure chamber 46 to provide an indication of the air remaining in the cylinder 12.

Various modifications and changes may be made with regard to the foregoing detailed description without departing from the spirit of the invention.

I claim:

1. Pressure responsive flow control apparatus for connection between a source of emergency breathing gas and a hood adapted to fit about a wearer's head for receiving the breathing gas at a controlled flow for inhalation and for receiving the exhalations of the wearer, said flow control apparatus comprising:
   a valve body having a first chamber adapted to receive breathing gas from said source to develop a source pressure;
   flow control valve means mounted to said valve body and including a valve portion defining a primary flow passage in communication with said first chamber;
   a control housing mounted to said valve body and including a secondary flow passage adapted to discharge breathing gas to said hood;
   a pressure regulating valve located adjacent said valve portion of said flow control valve means and defining a second chamber with said control housing, and including a through passage providing communication between said primary flow passage and said second chamber, said pressure regulating valve tending to move toward said valve portion in closer proximity to said primary flow passage in response to pressure in said second chamber thereby to reduce the rate of flow of gas through said primary flow passage;
   first bias means tending to resist movement of said pressure regulating valve into said closer proximity to said primary flow passage; said valve portion of said flow control means tending to move toward said pressure regulating valve in response to said source pressure in said first chamber thereby to reduce the rate of flow of gas through said primary flow passage, said flow control means including second bias means tending to resist movement of said valve portion of said flow control means toward said pressure regulating valve whereby said flow control valve means effects an increase in the rate of flow of gas through said primary flow passage in substantially inverse proportion to a decrease in said source pressure thereby to compensate for increased concentration of carbon dioxide in said hood resulting from cumulative said exhalations;

a retainer mounted to said valve body and receiving said control housing for movement toward and away from said pressure regulating valve, said retainer and control housing including complemental faces movable away from and toward each other in correspondence to said movement of said control housing toward and away from said pressure regulating valve, respectively; and a release element receivable in said retainer in wedging relationship between said complemental faces and forcing said pressure regulating valve firmly against said primary flow passage to block the passage of gas therethrough.

2. Apparatus according to claim 1 wherein said flow control means is made of resilient material and said second bias means is constituted of the inherent resilience of the material of which said flow control means is made.

3. Apparatus according to claim 1 wherein said flow control means comprises a flow control valve and said second bias means comprises a first annular spring operative upon said flow control valve and a second annular spring interposed between said pressure regulating valve and said control housing.

4. Pressure responsive flow control apparatus for connection between a source of emergency breathing gas and a hood adapted to fit about a wearer's head for receiving the breathing gas at a controlled pressure for inhalation and for receiving the exhalations of the wearer, said flow control apparatus comprising:

a valve body including a cylindrical recess and a bore constituting a first chamber adapted to receive breathing gas from said source to develop a source pressure;

a centrally apertured retainer including a cylindrical skirt threadably mounted within said recess of said valve body and defining a first space;

a control housing having an elongated, centrally bored tube mount longitudinally movably disposed through the central aperture of said retainer and further having a cylindrical skirt longitudinally movably disposed within said first space and defining a second space in communication with the bore of said tube mount, said bore constituting a secondary flow passage adapted to discharge breathing gas to said hood;

a resilient flow control valve disposed between the base of said recess in said valve body and the inner circular extremity of said skirt of said retainer, and including a central valve portion having a primary flow passage in communication with said first chamber, said flow control valve being distendible in a downstream direction upon initial development of said source pressure in said first chamber;

a pressure regulating valve having a through passage and located in said second space and defining a second chamber with the base of said skirt of said control housing whereby gas flow passing from said primary flow passage, through said through passage and into said second chamber develops a pressure in said second chamber tending to move said pressure regulating valve into closer proximity with said primary flow passage to restrict the flow of gas therethrough; and set point bias means between said flow control valve and said pressure regulating valve and tending to resist movement of said pressure regulating valve into said closer proximity to said primary flow passage, the degree of resilience of the material of said flow control valve being selected such that said valve portion is moved away from said pressure regulating valve to increase the rate of flow of gas through said primary flow passage in inverse proportion to a decrease in said source pressure.

5. Apparatus according to claim 4 wherein said retainer and control housing include complemental faces movable away from and toward each other in correspondence to said movement of said control housing toward and away from said pressure regulating valve, respectively; and a release element receivable in said retainer in wedging relationship between said complemental faces and forcing said pressure regulating valve firmly against said primary flow passage to block the passage of gas therethrough.

6. Pressure responsive flow control apparatus for connection between a source of emergency breathing gas and a hood adapted to fit about a wearer's head for receiving the breathing gas at a controlled flow for inhalation and for receiving the exhalations of the wearer, said flow control apparatus comprising:

a valve body having a first chamber adapted to receive breathing gas from said source to develop a source pressure;

flow control valve means mounted to said valve body and including a valve portion defining a primary flow passage in communication with said first chamber;

a control housing mounted to said valve body and including a secondary flow passage adapted to discharge breathing gas to said hood;

a pressure regulating valve located adjacent said valve portion of said flow control valve means and defining a second chamber with said control housing, and including a through passage providing communication between said primary flow passage and said second chamber, said pressure regulating valve tending to move toward said valve portion in closer proximity to said primary flow passage in response to pressure in said second chamber thereby to reduce the rate of flow of gas through said primary flow passage;

first bias means tending to resist movement of said pressure regulating valve into said closer proximity to said primary flow passage; said valve portion of said flow control means tending to move toward said pressure regulating valve in response to said source pressure in said first chamber thereby to reduce the rate of flow of gas through said primary flow passage, said flow control means including second bias means tending to resist movement of said valve portion of said flow control means toward said pressure regulating valve whereby said flow control valve means effects an increase in the rate of flow of gas through said primary flow passage in substantially inverse proportion to a decrease in said source pressure thereby to compensate for increased concentration of carbon dioxide in said hood resulting from cumulative said exhalations;

a retainer mounted to said valve body and receiving said control housing for movement of said control housing between first and second positions relative to said pressure regulating valve for enabling and blocking gas flow, respectively, through said pressure regulating valve; and a release element receivable between said retainer and said control housing for maintaining said control housing in said second position, said release element being separable from said control housing to enable movement of said control housing to said first position.

* * * * *